United States Patent Office 3,279,645
Patented Oct. 18, 1966

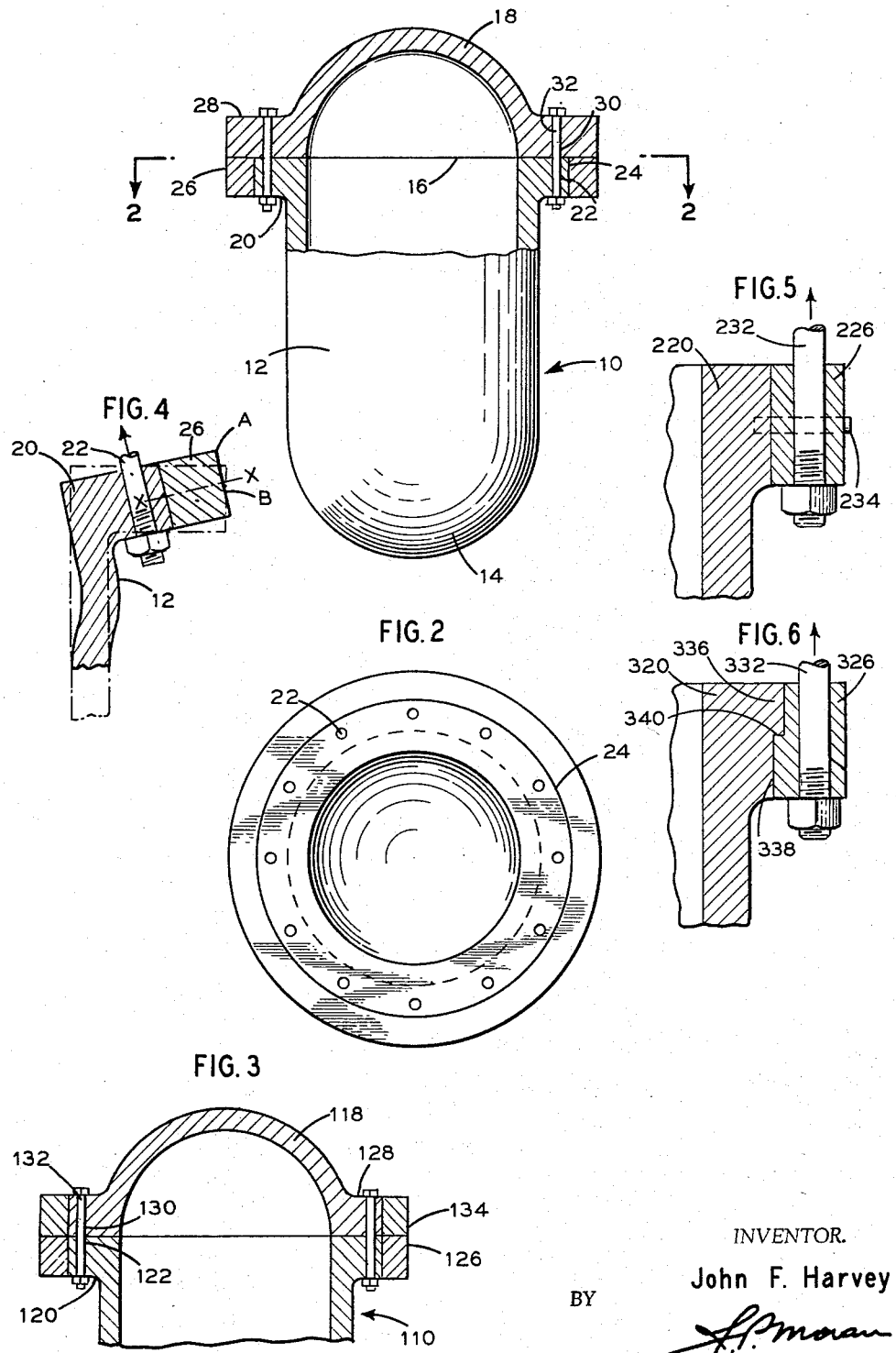

3,279,645
PRESSURE VESSEL CLOSURE ASSEMBLY
John F. Harvey, Akron, Ohio, assignor to The Babcock & Wilcox Company, New York, N.Y., a corporation of New York
Filed Apr. 23, 1964, Ser. No. 362,076
8 Claims. (Cl. 220—55)

This invention relates to a pressure vessel closure assembly and more particularly to a bolt-connected closure assembly for use on large diameter pressure vessels.

In recent years the size of pressure vessels has steadily increased until the point has now been reached where vessel size often presents a stringent shipping problem. Most vessels are shipped or transshipped via railroad so that the vessel dimensions and especiallly overall diameter are limited by the allowable clearances available on the nation's railroads. The problem is to provide a construction, which for the requisite size and strength of the vessel, will not exceed allowable shipping clearances.

Therefore, it is a primary object of the present invention to furnish a vessel and closure assembly which may be suitably transported using existing facilities for assembly at the construction site even though its maximum overall diameter exceeds maximum shipping clearances.

Accordingly, the present invention provides a pressure vessel closure assembly comprising an axially elongated flanged vessel which has a flanged closure member for its open end. Bolts or similar devices are employed to secure the closure member to the vessel. The flange of the vessel is reinforced by a ring having an interference fit on its periphery.

The various features of novelty which characterize this invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Of the drawings:

FIG. 1 is a view partly in section of a pressure vessel embodying the present invention;

FIG. 2 is a top view of a vessel taken along line 2—2;

FIG. 3 is a partial vertical section of a pressure vessel showing another embodiment of the present invention;

FIG. 4 is a sketch indicating the forces acting on the vessel flange shown in FIG. 1;

FIG. 5 is a partial vertical section of a pressure vessel flange showing a further embodiment of the present invention; and FIG. 6 is a partial vertical section of a pressure vessel flange showing still another embodiment of the present invention.

In FIG. 1 there is shown a pressure vessel assembly 10 comprising walls forming a vessel portion 12 closed at its lower end 14 and having its upper end 16 sealed by a closure member 18. Integral with the vessel portion 12 a flange 20 extends radially outward from the vessel wall at the open end 16. It contains bolt holes 22 uniformly spaced on a circle located inwardly from the outer edge 24 of the flange 20. Tightly fitted about the periphery of the flange 20 is a reinforcing ring 26.

As illustrated in FIG. 1 the closure member 18 has a flange section 28 which mates with the flange 20 and its ring 26. Additionally, flange section 28 has bolt holes 30 which are in register with the holes 22 in the vessel flange 20. The closure member 18 is secured to the flange of the pressure vessel by bolts 32. While bolts are shown in the drawings, it will be understood that studs or similar bolt-like devices may be employed in securing the closure member to the vessel.

In the pressure vessel 110 shown in FIG. 3, the construction is similar to that in FIG. 1 in that the ring 126 is fitted onto the flange 120, however, the flange section 128 of the closure member 118 is also fitted with a similar ring 134. The aligned bolt holes 122 and 130 in the vessel flange and closure member flange respectively receive bolts 132 for securing the closure member to the vessel.

In FIGS. 1 and 3 the bolts are located in the vessel flanges and as a consequence no shear loads need be transferred across the flange-reinforcing ring interface.

However, if, due to vessel size, it is required to locate the bolts in the reinforcing ring, FIGS. 5 and 6 disclose two arrangements which may be employed.

As shown in both FIGS. 5 and 6, bolts 232 and 332 pass through reinforcing rings 226 and 326, respectively. In such arrangements the bolt load must be transferred across the flange-reinforcing ring interface to the vessel. While this transfer of bolt load may be taken up by the frictional resistance of the shrink fit of the ring onto the flange, it might be preferable to use more positive means for conveying the load from one section to the other. In FIG. 5 locking pins 234 transfer the load from the ring 226 to the flange 220. Correspondingly, in FIG. 6 the opposing faces 336 and 338 of the flange 320 and the ring 326, respectively, are stepped to provide a ledge 340 which conveys the bolt load from the ring to the flange.

It is intended that the various vessel embodiments shown in the drawings be shipped without the rings on the flanges thereby reducing the overall diameter of the vessel to facilitate shipping. At the job site the ring is securely fitted to the flange by a shrink fit. In this way the requisite vessel flange diameter is achieved without affecting the ability of the pressure vessel assembly to be shipped via rail. The reinforcing ring 26, for example, even though its diameter is greater than that of the flange 20, can also be transported separately so that it does not exceed the allowable shipping clearances.

In the past it has been known to employ banded or laminated vessel wall constructions. Such a vessel is shown in Patent No. 2,376,351, and it will be noted that the bands on such vessels take tension or hoop stresses uniformly throughout their cross section. However, the stresses acting on the flange and reinforcing ring in the present invention are entirely unlike those operating on the wall and bands of a laminated vessel.

In FIG. 4 the phantom lines show the disposition of the vessel flange and reinforcing ring before any load is placed on them and the full lines show, in an exaggerated fashion, the deflection they undergo when internal pressure is applied in the vessel. With the buildup of pressure within the vessel, the bolts 22 securing the closure member 18 to the vessel flange 20 exert an upward pull on the flange causing both it and the ring to deflect. As illustrated, due to the displacement of the flange, the outer upper edge A of the ring moves upwardly and inwardly while its outer lower edge B moves upwardly and outwardly. In effect, it appears that the ring in reaction to the deflection of the flange is being turned inside out.

With the bolts 32 arranged as shown in FIG. 4, the present invention has the advantage that while the flange must transfer the shear load on the bolts to the vessel wall, the reinforcing ring is not required to take any load in shear. The rotation of the flange, however, does place a uniformly distributed radial bending moment on the ring. The radial bending moment, while not producing torsion in the ring, does produce a bending moment about the X—X axis of the ring. Thus, as the ring resists the rotational deflection of the flange, its lower portion below the X—X axis is in tension while its upper portion is in compression. In effect, the stress acting upon the ring is analogous to that which induces the bending moment in a uniformly loaded beam. Hence, the stress within the ring is quite unlike the tension stress within the bands of a laminated vessel. It will be apparent that the stress conditions, when the bolts are located within the reinforcing ring, as in FIGS. 5 and 6, will also be different from those in a laminated vessel.

While the ring is shown as being rectangular in cross section in the drawings, it may also have other cross sections such as that of a channel shape with its high section modulus arranged about the X—X axis of the ring. Additionally, it is not necessary that the ring be the same thickness as the flange, as long as it adequately reinforces the flange. However, it is an important requirement that the flange and reinforcing ring interface be in tightly fitting engagement so that the rotation of all corresponding surfaces is equal.

Further, since the ring does not take any shear when the bolts are located in the flange, it does not require pins or other devices for fastening it to the flange for the purpose of transferring or transmitting the shear stresses to the flange 20.

By employing the reinforcing ring, which can be assembled on the vessel at the construction site, the overall vessel dimensions may be reduced to within those permissible for rail transportation. It is possible to either fabricate the ring in the shop or at the vessel erection site. Further, this construction permits the ring to be made of higher tensile plate material as compared to the forged material which must be used for the flange portion of the vessel.

While the invention has been particularly described with regard to rail transport, it would have equal application to highway shipment of large diameter pressure vessels where clearances are a problem. Further, while the invention has been described in combination with bolt-connected closure assemblies, it would be equally applicable to vessel closures employing other types of connecting means such as shear rings.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:
1. A closure assembly for a pressure vessel comprising:
(A) wall structure forming an axially elongated vessel open at one end,
(B) a flange integrally attached to and extending radially outward from said vessel wall at its open end,
(C) a closure member for the open end of said vessel, and
(D) a reinforcing ring of unitary construction located about the periphery of said flange and having an interference fit therewith to resist any bending of said flange tending to increase a peripheral dimension thereof in radial direction.

2. An assembly according to claim 1 further including means for attaching said closure member to said vessel.

3. An assembly according to claim 2 wherein said attaching means includes bolt-type means secured to said flange.

4. A pressure vessel closure assembly comprising:
(A) walls forming an axially elongated cylindrically shaped vessel open at one end,
(B) a flange integrally attached to and extending radially outward from said vessel wall at its open end, said flange having a number of bolt hole openings therein circumferentially spaced on a bolt circle having a diameter less than the outside diameter of said flange,
(C) a closure member for the open end of said vessel, said closure member having a number of bolt hole openings therein arranged to register with the openings in said vessel flange,
(D) bolt-type means disposed within the openings in said vessel flange and closure member for securing said closure member to said vessel, and
(E) a reinforcing ring of unitary construction located about the periphery of said vessel flange and having an interference fit therewith to resist any bending of said flange tending to increase a peripheral dimension thereof in radial direction.

5. A pressure vessel closure assembly comprising:
(A) walls forming an axially elongated cylindrically shaped vessel open at one end,
(B) a flange integrally attached to and extending radially outward from said vessel wall at its open end, said flange having a number of bolt hole openings therein circumferentially spaced on a bolt circle having a diameter less than the outside diameter of said flange,
(C) a closure member for the open end of said vessel,
(D) a flange integrally attached to said closure member and extending radially outward therefrom and arranged to mate with the flange on said vessel, said closure member flange having a number of openings therein arranged to register with the openings in said vessel flange,
(E) a bolt-type means disposed within the openings in said vessel and closure member flanges for securing said closure member to said vessel, and
(F) a reinforcing ring of unitary construction located about the periphery of each of said vessel and closure member flanges and having an interference fit therewith to resist any bending of said flange tending to increase a peripheral dimension thereof in radial direction.

6. A pressure vessel closure assembly comprising:
(A) walls forming an axially elongated vessel open at one end,
(B) a flange integrally attached to and extending radially outward from said vessel wall at its open end,
(C) a reinforcing ring of unitary construction located about the periphery of said vessel flange and having an interference fit therewith to resist any bending of said flange tending to increase a peripheral dimension thereof in radial direction, said ring having a number of bolt hole openings therein;
(D) a closure member for the open end of said vessel, said closure member having a number of bolt hole openings therein arranged to register with the openings in said reinforcing ring,
(E) bolt-type means disposed within the openings in said reinforcing ring and closure member for securing said closure member to said vessel, and
(F) means for transferring the bolt load from the reinforcing ring to the vessel.

7. A pressure vessel closure assembly comprising:
(A) walls forming an axially elongated vessel open at one end,
(B) a flange integrally attached to and extending radially outward from said vessel wall at its open end,
(C) a reinforcing ring located about the periphery of said vessel flange and having an interference fit therewith, said ring having a number of bolt hole openings therein,
(D) a closure member for the open end of said vessel, said closure member having a number of bolt hole openings therein arranged to register with the openings in said reinforcing ring,
(E) bolt-type means disposed within the openings in said reinforcing ring and closure member for securing said closure member to said vessel, and (F) pin means disposed within and extending between said vessel flange and reinforcing ring for transferring the bolt load from said reinforcing ring to said vessel.

8. A pressure vessel closure assembly comprising:
(A) walls forming an axially elongated vessel open at one end,
(B) a flange integrally attached to and extending radially outward from said vessel wall at its open end,
(C) a reinforcing ring of unitary construction located about the periphery of said vessel flange and having an interference fit therewith to resist any bending of said flange tending to increase a peripheral dimension thereof in radial direction, said ring having a number of bolt hole openings therein,
(D) a closure member for the open end of said vessel, said closure member having a number of bolt hole openings therein arranged to register with the openings in said reinforcing ring,
(E) bolt-type means disposed within the openings in said reinforcing ring and closure member for securing said closure member to said vessel, and
(F) the contacting faces of said vessel flange and said reinforcing ring arranged in stepped relationship for transferring the upwardly directed bolt load from said reinforcing ring to said vessel.

References Cited by the Examiner

UNITED STATES PATENTS

| 1,593,041 | 7/1926 | Stewart | 292—256.67 |
| 2,715,477 | 8/1955 | North | 220—55 |

FOREIGN PATENTS

| 966,450 | 8/1964 | Great Britain. |

THERON E. CONDON, *Primary Examiner.*

G. T. HALL, *Assistant Examiner.*